US012456361B2

(12) United States Patent
Kunze et al.

(10) Patent No.: US 12,456,361 B2
(45) Date of Patent: *Oct. 28, 2025

(54) CENTRAL FIRE ALARM SYSTEM

(71) Applicant: Siemens Schweiz AG, Zürich (CH)

(72) Inventors: Axel Kunze, Zürich (CH); Konstantin Klein, Lucerne (CH)

(73) Assignee: SIEMENS SCHWEIZ AG, Zurich (CH)

( * ) Notice: Subject to any disclaimer, the term of this patent is extended or adjusted under 35 U.S.C. 154(b) by 107 days.

This patent is subject to a terminal disclaimer.

(21) Appl. No.: 18/247,712

(22) PCT Filed: Sep. 8, 2021

(86) PCT No.: PCT/EP2021/074641

§ 371 (c)(1),
(2) Date: Apr. 3, 2023

(87) PCT Pub. No.: WO2022/073708

PCT Pub. Date: Apr. 14, 2022

(65) Prior Publication Data

US 2023/0410638 A1 Dec. 21, 2023

(30) Foreign Application Priority Data

Oct. 6, 2020 (DE) ..................... 10 2020 212 573.2

(51) Int. Cl.
*G08B 29/06* (2006.01)

(52) U.S. Cl.
CPC .................................... *G08B 29/06* (2013.01)

(58) Field of Classification Search
CPC ...... G08B 29/06; G08B 29/18; G08B 25/016; G08B 21/185; H04W 64/003
See application file for complete search history.

(56) References Cited

U.S. PATENT DOCUMENTS 10,750,321 B1 8/2020 Ravindran ............. G08B 29/02
2007/0181127 A1 8/2007 Jin et al. .................. 128/204.21

(Continued)

FOREIGN PATENT DOCUMENTS

CN 101002972 A 7/2007 ............. A61B 5/087
CN 101237101 A 8/2008 ........... G01R 19/155

(Continued)

OTHER PUBLICATIONS

Search Report for International Application No. PCT/EP2021/074641, 14 pages.
CN 101002972 A, US 2007/0181127 A1.

*Primary Examiner* — Mirza F Alam
(74) *Attorney, Agent, or Firm* — Slayden Grubert Beard PLLC

(57) ABSTRACT

Various embodiments of the teachings herein include a method for commissioning hazard detectors in a detector line. The method may include: operating a control center for the detectors for the installation and/or commissioning of the detectors in an installation mode; and in the case of an identified installation error, the control center sends a corresponding error message to the mobile communication terminal for display on an output apparatus of the mobile communication terminal and/or a corresponding error message for display on an output unit of the detector affected by the installation error; and checking the electrical properties of the detector line in the fire alarm control center.

15 Claims, 1 Drawing Sheet

(56) References Cited

U.S. PATENT DOCUMENTS

| | | | | |
|---|---|---|---|---|
| 2008/0084291 | A1 | 4/2008 | Campion | 340/514 |
| 2014/0009279 | A1* | 1/2014 | Tsubokawa | G08B 25/14<br>340/533 |
| 2015/0097664 | A1 | 4/2015 | Breed | G08B 29/00 |
| 2015/0142898 | A1 | 5/2015 | Piccolo, III | H04L 12/24 |
| 2016/0196730 | A1* | 7/2016 | Pandey | G08B 17/06<br>340/650 |
| 2016/0261458 | A1* | 9/2016 | Huang | H04L 43/0817 |
| 2016/0337720 | A1 | 11/2016 | Krishnamurthy | H04Q 9/00 |
| 2018/0342150 | A1* | 11/2018 | Steffen | G08B 25/14 |
| 2019/0317464 | A1 | 10/2019 | Frey | G05B 19/042 |
| 2019/0362618 | A1 | 11/2019 | Rao | G08B 25/03 |
| 2021/0020021 | A1* | 1/2021 | Sahai | A62C 37/04 |

FOREIGN PATENT DOCUMENTS

| | | | | |
|---|---|---|---|---|
| CN | 202471631 | U | 10/2012 | G01N 25/04 |
| CN | 203224976 | U | 10/2013 | G08B 17/06 |
| CN | 104240466 | A | 12/2014 | G08B 17/00 |
| CN | 104992536 | A | 10/2015 | G08B 17/00 |
| DE | 10 2016 215 550 | | 1/2018 | F24C 7/08 |
| JP | 2014157435 | A | 8/2014 | G08B 17/00 |
| WO | 2020/123417 | A1 | 6/2020 | G05B 23/02 |

* cited by examiner

CENTRAL FIRE ALARM SYSTEM

CROSS-REFERENCE TO RELATED APPLICATIONS

This application is a U.S. National Stage Application of International Application No. PCT/EP2021/074641 filed Sep. 8, 2021, which designates the United States of America, and claims priority to DE Application No. 10 2020 212 573.2 filed Oct. 6, 2020, the contents of which are hereby incorporated by reference in their entirety.

TECHNICAL FIELD

The present disclosure relates to alarm systems. Various embodiments of the teachings herein include central fire alarm systems for connecting a detector line to a plurality of detectors connected thereto, arrangements for building automation having a central fire alarm system, and/or methods for commissioning hazard detectors in a detector line.

BACKGROUND

Different work steps are required for the installation and commissioning of fire alarm systems. These are typically carried out in temporal sequence and by different people. It is fairly common during this process that errors, which have been made during the cabling, for instance, are only then noticed when the fire alarm system is to be put into operation. As a result, the subsequent trouble shooting proves to be difficult and time-consuming.

US 2015/0097664 A1 discloses a system for determining the maintenance requirement and for checking the installation of an alarm system, wherein the alarm system comprises a central monitoring station which is configured so that it receives actual measurements and applies maintenance rules to the actual measurements and a maintenance history for the alarm system in order to determine the maintenance requirement of the alarm system.

U.S. Pat. No. 10,750,321,B1 discloses apparatuses, methods and systems for infrastructure-free indoor navigation in a fire control system.

SUMMARY

The teachings of the present disclosure provide a central fire alarm system and a method, with which installation errors are identified immediately. For example, some embodiments include a fire alarm control center (Z) for connecting a detector line (ML) to a plurality of detectors (M1-M3) connected thereto, wherein for installation and/or commissioning of the detectors (M1-M3) the fire alarm control center (Z) can be operated in an installation mode, wherein in installation mode the fire alarm control center (Z) has a communication link (KV1, KV2, KV3) with a mobile communication terminal (MG) of a user (B), wherein in the case of an identified installation error the fire alarm control center (Z) sends a corresponding error message (FM1) to the mobile communication terminal (MG) for output on an output apparatus (D) of the mobile communication terminal (MG) and/or a corresponding error message (FM2, FM3) for output on an output unit (AE1-AE3) of the detector (M1-M3) affected by the installation error, wherein in order to check the electrical properties of the detector line (ML) one or more monitoring unit(s) is/are attached in the fire alarm control center (Z).

In some embodiments, the fire alarm control center (Z) is designed to apply a suitable line voltage (LS) to the detector line (ML) in installation mode, wherein the applied line voltage (LS) lies in a region so that it is possible to carry out cabling work on the detector line safely and amounts in particular to 5 V±1 V, 24 V±4V or 30 V±4V and is a direct voltage.

In some embodiments, the installation mode can be operated in a work step mode, in which, after each work step of the installation and/or the commissioning on the mobile communication terminal (MG), the status of the respective work step can be output.

In some embodiments, an installation error is a short-circuit on the detector line (ML) and/or an interruption in the detector line (ML) and/or an earth fault of the detector line (ML) and/or a reverse polarity of a respectively connected detector (M1-M3).

In some embodiments, the fire alarm control center (Z) is connected to a Cloud service (CS) inter alia for communication with the mobile communication terminal.

In some embodiments, the Cloud service (CS) is part of an Internet-based ecosystem for a building automation system, in which the fire alarm control center (Z) and the mobile communication terminal (MG) are registered.

In some embodiments, a detector (M1-M3), to be installed, of the detector line (ML) is connected to the Cloud service (CS) and obtains its respective configuration data from the Cloud service (CS) by way of a suitable communication link.

In some embodiments, the fire alarm control center (Z) is designed to automatically synchronize information with the Cloud service (CS) via an installed detector (M1-M3).

As another example, some embodiments include an arrangement for a building automation for a building, comprising: a fire alarm control center (Z) as claimed in one of the preceding claims; a mobile communication terminal (MG), designed for communication with the fire alarm control center (Z); a Cloud server, designed for storing a building plan and/or a building information model for the building; wherein the mobile communication terminal (MG) is designed to transmit position data for an installed detector (M1-M3) to the Cloud server, and wherein the respective position data of the installed detector (M1-M3) is entered in the building plan and/or building information model (BIM) stored on the Cloud server, wherein in order to check the electrical properties of the detector line (ML) one or more monitoring unit(s) is/are attached in the fire alarm control center (Z).

In some embodiments, the arrangement further comprises a positioning system, in particular an indoor positioning system, wherein the position of the mobile communication terminal (MG) can be determined by the positioning system and can be assigned to the respectively installed detector (M1-M3).

In some embodiments, a detector (M1-M3) to be installed is connected to the Cloud server by way of a suitable communication link and via this communication link obtains its respective configuration data from the Cloud service by a download initiated by the mobile communication terminal (MG).

As another example, some embodiments include a method for commissioning hazard detectors (M1-M3) in a detector line (ML), in particular fire alarm boxes, (VS1) wherein a control center (Z) for the detectors (M1-M3), in particular a fire alarm control center (Z), is operated for the installation and/or commissioning of the detectors (M1-M3) in an installation mode, (VS2) wherein in installation mode the control center (Z) has a communication link (KV1, KV2, KV3) with a mobile communication terminal (MG) of a user (B), (VS3) wherein in the case of an identified installation error, the control center sends a corresponding error message (FM1) to the mobile communication terminal (MG) for output on an output apparatus (D) of the mobile communication terminal (MG) and/or a corresponding error message (FM2, FM3) for output on an output unit (A1-A3) of the detector (M1-M3) affected by the installation error, wherein the electrical properties of the detector line (ML) are checked in the fire alarm control center (Z).

In some embodiments, the detector line (ML) is applied with a line voltage (LS), which is safe for a commissioning engineer, in particular with a line voltage (LS) of 5 V±1 V, 24 V±4V or 30 V±4V, wherein the line voltage (LS) is in particular a direct voltage.

In some embodiments, the installation mode is operated in a work step mode, in which, after each work step of the installation and/or the commissioning on the mobile communication terminal (MG), the status of the respective work step is output for a respective detector (M1-M3).

In some embodiments, an installation error is a short-circuit on the detector line (ML) and/or an interruption in the detector line (ML) and/or an earth fault of the detector line (ML) and/or a reverse polarity of a respectively connected detector (M1-M3).

BRIEF DESCRIPTION OF THE DRAWINGS

Teachings of the present disclosure and advantageous embodiments of the present disclosure are explained in the example of the Figure below. In the figures.

DETAILED DESCRIPTION

Figure 1:
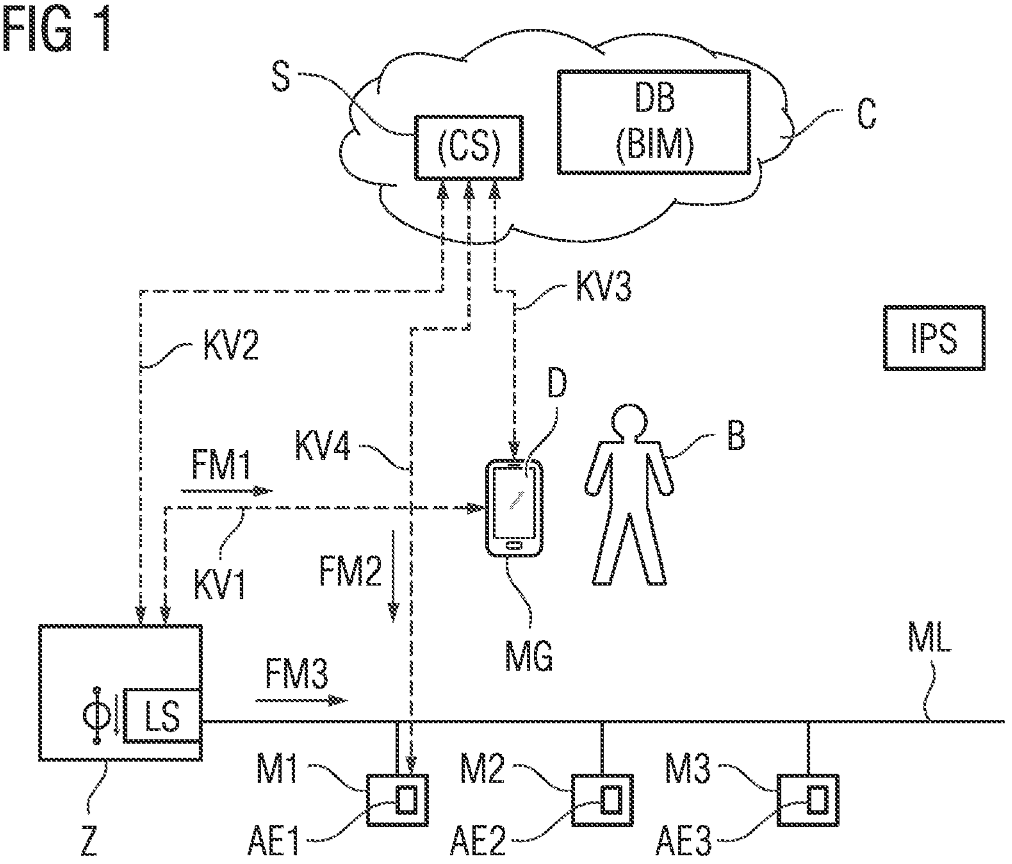
FIG. 1 shows an exemplary arrangement with an example fire alarm control center incorporating teachings of the present disclosure.

Various embodiments of the teachings herein include a fire alarm control center for connecting a detector line to a plurality of detectors connected thereto, wherein for the installation and/or commissioning of the detectors the fire alarm control center can be operated in an installation mode, wherein in installation mode the fire alarm control center has a communication link with a mobile communication terminal of a user (e.g. commissioning engineer). In the case of an identified installation error, the fire alarm control center sends a corresponding error message to the mobile communication terminal for output on an output apparatus (e.g. display, audio output apparatus) of the mobile communication terminal. Alternatively or additionally, the fire alarm control center sends a corresponding error message for output on or to the detector affected by the installation error or on the installed device. One or a number of monitoring unit(s) for checking the electrical properties of the detector line are attached in the fire alarm control center and/or in the respective detectors.

Installation errors can be identified for instance by one or more monitoring unit(s) for checking the electrical properties of the detector line, e.g. by one or more short-circuit identification units and/or by one or more overcurrent identification units and/or by one or more voltage detectors. An LED built onto the installed device could be a further possible information output, e.g. the internal alarm indicator or the external alarm indicator when connecting to a point detector. E.g. a specific blinking pattern or a specific sound can confirm correct cabling.

Thus it is possible to check the accuracy of the installation at the time of installing the detector line. In some embodiments, the installer is made immediately aware of an identified installation error by means of a "push service" (in real-time). This is carried out by means of a corresponding output (e.g. in the form of an error message) on the mobile communication terminal (e.g. smartphone, tablet computer, smart watch, smart glasses) of the installer. The output can be carried out as a text message and/or as a graphic and/or as an audio message, e.g. on the display and/or by means of the loudspeaker. In some embodiments, the mobile communication terminal is a device which is capable of augmented reality or supports augmented reality.

In some embodiments, the fire alarm control center is designed to apply a suitable line voltage to the detector line in installation mode. The applied line voltage lies in a range so that it is possible to carry out cabling work on the detector line safely.

In some embodiments, the line voltage amounting to essentially 30 volts. If the applied line voltage amounts to essentially 30 volts, (e.g. in the region of 30±4 V), cabling work can be carried out on the detector line safely. Applying voltage to the detector line can in principle also be carried out safely for a commissioning engineer by means of other line voltages. The line voltage can therefore also amount to essentially 24 volts (e.g. in the region of 24±3 V). The line voltage can also amount to essentially 5 volts (e.g. in the region of 5±1 V). A scaling of the checking possibilities during error identification can be performed inter alia by means of the possibility of using different line voltages.

Depending on the line voltage available, corresponding monitoring units can be used, which are already used for installation and/or also for commissioning. The line voltage is typically a direct voltage. In some embodiments, the line voltage for the detector line is essentially applied with no more than 30 volts.

In some embodiments, the installation mode being operable in a work step mode, in which after each work step of the installation and/or the commissioning on the mobile communication terminal, the status of the respective work step can be output. Therefore, installation errors can be identified on the work step plane and assigned to a work step.

In some embodiments, checking the work in progress of the cabling takes place remotely. In some embodiments, this is carried out by communication between the mobile communication terminal and a project planning tool (e.g. MS Project) of a site engineer or architect. This is highly relevant since the commissioning of the fire alarm control center requires an error-free cabling and is often on the critical path for the opening of a new development in terms of time. Nowadays, fire safety commissioning engineers often travel to site several times in order to assure themselves of the work progress of the electrician. This does not apply with the invention.

In some embodiments, an installation error being a short-circuit on the detector line and/or an interruption in the detector line and/or an earth fault in the detector line and/or a reverse polarity of a respectively connected detector. In installation mode, the detector line is continuously monitored electrically; reverse polarities, overcurrents, interruptions are identified immediately. The checks for installation errors are therefore carried out even during the installation work. Nowadays, an installation error is only checked with a more or less fully commissioned system.

In some embodiments, the fire alarm control center already being connected to a Cloud service during the installation phase, inter alia for communication purposes with the mobile communication terminal. The fire alarm control center to this end has a connection to the Internet (e.g. WLAN, 5G modem) and the installer is continuously connected to the fire alarm control center and the Cloud service during the work by way of their mobile terminal (e.g. smartphone, tablet, smart watch, smart glasses, AR device). In some embodiments, the Cloud service has access to building plans and/or to a building information model (BIM). In some embodiments, installations carried out on the detector line are entered directly into the building plan and/or the building information model.

In some embodiments, the Cloud service being part of an Internet-based ecosystem for a building automation system, in which the fire alarm control center and the mobile communication terminal are registered (for a user or for a user group). As a result, information inter alia relating to the building (e.g. assets available and/or built into the building (e.g. HVAC infrastructure) can be provided on the mobile communication device, e.g. in the form of augmented reality information/animations).

In some embodiments, registration is carried out independently of the device, i.e. when a user registers, the registration and/or the corresponding access authorization applies to several devices. I.e. a registered user (e.g. installer) has an access authorization (user account), which enables them, if applicable in a device-independent manner, to obtain information relating to specific sites according to the authorization of their user account.

In some embodiments, a detector, to be installed, of the detector line being connected to the Cloud service and obtaining its respective configuration data from the Cloud service by way of a suitable communication link. If configuration data for the respective installation already exists in the Cloud, the detector type can additionally be checked and a configuration of the detector can be performed by way of a download of the configuration data. This increases the efficiency of the installation.

In some embodiments, the fire alarm control center being designed to automatically synchronize information relating to an installed detector with the Cloud service. As a result, the data consistency between the detector data and documentation (I-Base) is ensured by way of built-in detectors. In some embodiments, the synchronization is carried out by way of an automatic synchronization with a building information model (BIM). This ensures that data stored in the building information model or in a building plan is consistent with the detector data in the field.

In some embodiments, there is an arrangement for a building automation for a building, the arrangement comprising: a fire alarm control center as claimed in one of the preceding claims; a mobile communication terminal, designed for communication with the fire alarm control center; a Cloud server, designed for storing a building plan and/or a building information model for the building; wherein the mobile communication terminal is designed to transmit position data for an installed detector to the Cloud server, and wherein the respective position data of the installed detector is entered in the building plan and/or building information model (BIM) stored on the Cloud server, and wherein one or a number of monitoring unit(s) for checking the electrical properties of the detector line are attached in the fire alarm control center and/or in the respective detectors.

The arrangement can be realized using commercial components. This arrangement makes it possible to check the accuracy of the installation at the point in time that the detector line is installed. In some embodiments, the installer is made immediately aware of an identified installation error by means of a "push service", (in real-time). This is carried out by means of a corresponding output (e.g. in the form of an error message) on the mobile communication terminal (e.g. smartphone, tablet computer, smart watch, smart glasses) of the installer. The output can be carried out as a text message and/or as a graphic and/or as an audio message, e.g. on the display and/or by means of the loudspeaker. The mobile communication terminal is advantageously a device which is capable of augmented reality or supports augmented reality.

In some embodiments, the arrangement comprising a positioning system, in particular an indoor positioning system, wherein the position of the mobile communication terminal can be determined by the positioning system and can be assigned to the respectively installed detector. Indoor positioning systems (IPS) are nowadays widespread in buildings. Indoor positioning systems can be based e.g. on WLAN and/or on iBeacons (BLE, Bluetooth Low Energy). A position determination can also be carried out by way of access to building plans and/or to a building information model (BIM) and sensor system of the mobile communication terminal (e.g. smartphone with e.g. acceleration sensors, magnetic field sensors).

In some embodiments, a detector to be installed being connected to the Cloud server by way of a suitable communication link and by way of this communication link obtaining its respective configuration data from the Cloud service by means of download initiated by the mobile communication terminal. If configuration data for the respective installation already exists in the Cloud, the detector type can additionally be checked and a configuration of the detector can be performed by way of a download of the configuration data. This increases the efficiency of the installation.

In some embodiments, the arrangement is a fire alarm system. The installation and programming of the installation (fire alarm system and/or fire alarm control center) are carried out in parallel in terms of time, which results in greater efficiency (use optimization of the required people), a quicker provision of the fully configured installation and a higher quality.

In some embodiments, there is a method for commissioning hazard detectors in a detector line, in particular fire alarm boxes, wherein for the installation and/or commissioning of the detectors, a control center for the detectors, in particular a fire alarm control center, is operated in an installation mode, wherein in installation mode the control center has a communication link with a mobile communication terminal of a user (e.g. commissioning engineer), wherein in the case of an identified installation error, the control center sends a corresponding error message to the mobile communication terminal (e.g. smartphone, tablet computer) for output on an output apparatus (display, audio) of the mobile communication terminal and/or a corresponding error message for output on the detector affected by the installation error, and wherein the electrical properties of the detector line (ML) are checked in the fire alarm control center (Z) and/or in the respective detectors (M1-M3).

The method can be realized by means of commercial components (COTS, Commercials off the shelf).

In some embodiments, the line voltage amounting to essentially 30 volts. If the applied line voltage amounts to essentially 30 volts, (e.g. in the region of 30±4 V), cabling work can be carried out on the detector line safely. Applying voltage to the detector line can in principle also be carried out safely for a commissioning engineer by means of other line voltages. The line voltage can therefore also amount to essentially 24 volts (e.g. in the region of 24±3 V). The line voltage can also amount to essentially 5 volts (e.g. in the region of 5±1 V). The respective line voltage is typically a direct voltage.

In some embodiments, the installation mode being operated in a work step mode, in which after each work step of the installation and/or of the commissioning on the mobile communication terminal, the status of the respective work step is output for a respective detector. Therefore, installation errors can be identified at the work steps level and assigned to a work step.

In some embodiments, an installation error being a short-circuit on the detector line and/or an interruption in the detector line and/or an earth fault in the detector line and/or a reverse polarity of a respectively connected detector. In installation mode, the is applied essentially with a line voltage of 5 volts and continuously monitored electrically; reverse polarities, overcurrents, interruptions are identified immediately.

FIG. 1 shows an exemplary arrangement with an example fire alarm control center Z incorporating teachings of the present disclosure. The fire alarm control center Z is designed to connect a detector line ML to a plurality of detectors M1-M3 connected thereto, wherein for the installation and/or commissioning of the detectors M1-M3, the fire alarm control center Z can be operated in an installation mode, wherein in installation mode the fire alarm control center Z has a communication link KV1-KV3 with a mobile communication terminal MG of a user B (e.g. installer, commissioning engineer), wherein in the case of an identified installation error the fire alarm control center z sends a corresponding error message FM1 to the mobile communication terminal MG for output to an output apparatus D (e.g. display, audio output unit, loudspeaker) of the mobile communication terminal MG (e.g. smartphone, tablet computer, smart watch, smart glasses) and/or sends a corresponding error message FM2, FM3 for output on the detectors M1-M3 affected by the installation error.

The mobile communication terminal MG can be connected via data link directly to the fire alarm control center Z by way of a suitable communication link KV1, e.g. via WLAN, Bluetooth or via a mobile data network (GSM, UMTS, 4G, 5G). The mobile communication terminal MG can be connected via data link also indirectly to the fire alarm control center Z by way of suitable communication links KV2, KV3, e.g. via a Cloud service CS, e.g. Via Internet, via WLAN, Bluetooth or via a mobile data network (GSM, UMTS, 4G, 5G).

With an identified installation error, the fire alarm control center Z can send a corresponding error message FM1 via the communication link KV1 directly to the mobile communication terminal MG of a user B. The error message FM1 can be output on the mobile communication terminal MG via text and/or as a graphic and/or acoustically on suitable output means (e.g. display D, loudspeaker).

With an identified installation error, the fire alarm control center Z can however also send a corresponding error message indirectly via a corresponding Cloud service CS to the mobile communication terminal MG of the user B, e.g. by way of corresponding communication links KV2, KV3.

With an identified installation error, the fire alarm control center Z can send a corresponding error message FM3 also via the detector line ML to the detectors M1-M3 affected by the installation error. Here the detector line ML advantageously comprises an electrical supply line, which can also be used to transmit information. The detectors M1-M3 comprise in each case output elements AE1-AE3 for outputting the error message FM3 via text and/or visually and/or graphically and/or acoustically.

With an identified installation error, the fire alarm control center Z can also send a corresponding error message FM2 also indirectly via the corresponding Cloud service CS to the detectors M1-M3 affected by the installation error, e.g. via corresponding communication links KV2, KV4, e.g. via WLAN, Bluetooth or via a mobile data network (GSM, UMTS, 4G, 5G).

The arrangement may be designed for building automation (e.g. for a building automation system) for a building. In some embodiments, the arrangement comprises:

- a fire alarm control center Z;
- a mobile communication terminal MG, designed for communication KV1-KV3 with the fire alarm control center Z;
- a Cloud server, designed for storing a building plan and/or a building information model BIM for the building;
- wherein the mobile communication terminal MG is designed to transmit position data for an installed detector M1-M3 to the Cloud server S, and wherein the respective position data of the installed detectors M1-M3 can be entered i.e. can be stored in the building plan and/or building information model BIM stored on the Cloud server S. The building plan and/or the building information model BIM are stored in a suitable database DB (e.g. relational database or IN memory database). The Cloud server S and the database DB are advantageously realized in a Cloud infrastructure C with corresponding communication links KV2, KV3.

The arrangement makes it possible to check the accuracy of the installation at the point in time of installing the detector line ML. In some embodiments, the installer is made immediately aware of an identified installation error by means of a "push service" (in real-time). This is carried out by means of a corresponding output (e.g. in the form of an error message) on the mobile communication terminal (e.g. smartphone, tablet computer, smart watch, smart glasses) of the installer. The output can be carried out as a text message and/or as a graphic and/or as an audio message, e.g. on the display D and/or by means of the loudspeaker. The mobile communication terminal MG is advantageously a device which is capable of augmented reality or supports augmented reality.

In some embodiments, the fire alarm control center Z is designed to apply a suitable line voltage LS to the detector line ML in installation mode. In some embodiments, the line voltage amounts to essentially no more than 30 volts.

In some embodiments, the installation mode can be operated in a work step mode, in which, after each work step of the installation and/or the commissioning on the mobile communication terminal MG, the status of the respective work step can be output.

An installation error can be e.g. a short-circuit on the detector line and/or an interruption in the detector line and/or an earth fault in the detector line and/or a reverse polarity of a respectively connected detector. Installation errors can be identified e.g. by one or more monitoring unit(s) for checking the electrical properties of the detector line, e.g. by one or more short-circuit identification units and/or by one or more overcurrent identification units and/or by one or more voltage detectors. The one or more monitoring unit(s) can be attached in the fire alarm control center Z and/or in the respective detectors M1-M3.

In some embodiments, the fire alarm control center Z is connected to a Cloud service CS inter alia for communication with the mobile communication terminal MG.

In some embodiments, the Cloud service CS is part of an Internet-based ecosystem for a building automation system, in which the fire alarm control center Z and the mobile communication terminal MG are registered. The Cloud service CS and the ecosystem are realized on a Cloud server S. The ecosystem has access to a database DB with the building information model BIM for the building. By way of the mobile communication terminal MG, a user N can obtain relevant (e.g. data required in the field, e.g. configuration data and/or set parameters for detectors M1-M3) from the ecosystem.

A detector M1-M3, of the detector line ML, which is to be installed is connected to the Cloud service CS, wherein it can obtain its respective configuration data from the Cloud service CS by way of a suitable communication link KV4 (e.g. Internet, radio link), e.g. by means of a download initiated by way of the mobile communication terminal MG.

In some embodiments, the fire alarm control center Z is designed to automatically synchronize information relating to an installed detector M1-M3 with the Cloud service CS and/or the building information model BIM.

In some embodiments, the arrangement comprises a positioning system IPS, in particular an indoor positioning system, wherein the position of the mobile communication terminal MG can be determined by the positioning system and can be assigned to the respectively installed detector M1-M3. The indoor positioning system IPS can be based e.g. on WLAN data evaluation and/or on iBeacons.

The fire alarm control center Z has a specific installation mode, in which the line ML is continuously (e.g. continually) monitored electrically, in particular during the installation and/or during the commissioning. Short circuits, interruptions, earth faults or reverse poled detectors are thus identified immediately, i.e. even during the installation process. If required for safety or medical reasons, in installation mode the line voltage is reduced, e.g. to so that it is possible to carry out cabling work on the live line safely.

In some embodiments, the fire alarm control center Z has a connection to the Internet (e.g. via a 5G modem). In this way it is associated with a Cloud service CS, which continuously gives feedback to the installer during the work by way of a mobile terminal MG (e.g. smartphone, tablet, smart watch, smart glasses, . . . ) and/or by way of light patterns in the integrated display elements of the built-in device (e.g. alarm indicator on the automatic fire alarm), to determine whether or not the last work step has been successfully executed. In case of a short circuit, a corresponding message would take place immediately for instance, e.g. by means of an acoustic signal. The message can be output on the detector M1-M3 and/or on the mobile device MG of the user B.

If configuration data already in the Cloud CS, C exists for the respective installation, the detector type can additionally be checked and a configuration of the corresponding detector M1-M3 can be performed.

In some embodiments, the smartphone or tablet MG of the installer B has position information by means of a known indoor positioning method IPS. If a new detector M1-M3 is installed, the Cloud service CS requests the current position and links this with the location (installation site) of the detector M1-M3. If additional plans of the building and/or building information model BIM are available in the Cloud CS, C, the detector, with a unique identification, can be positioned directly in these plans or in the BIM. In some embodiments, alternatively to the automatic link by means of position information, a manual link by an app (e.g. Smartphone app) of the mobile communication terminal MG is also possible.

In some embodiments, the information relating to newly added devices M1-M3 is automatically synchronized with the Cloud service CS by the fire alarm control center Z, so that these can be used for simultaneous work on the programming of the fire alarm system.

Figure 2:
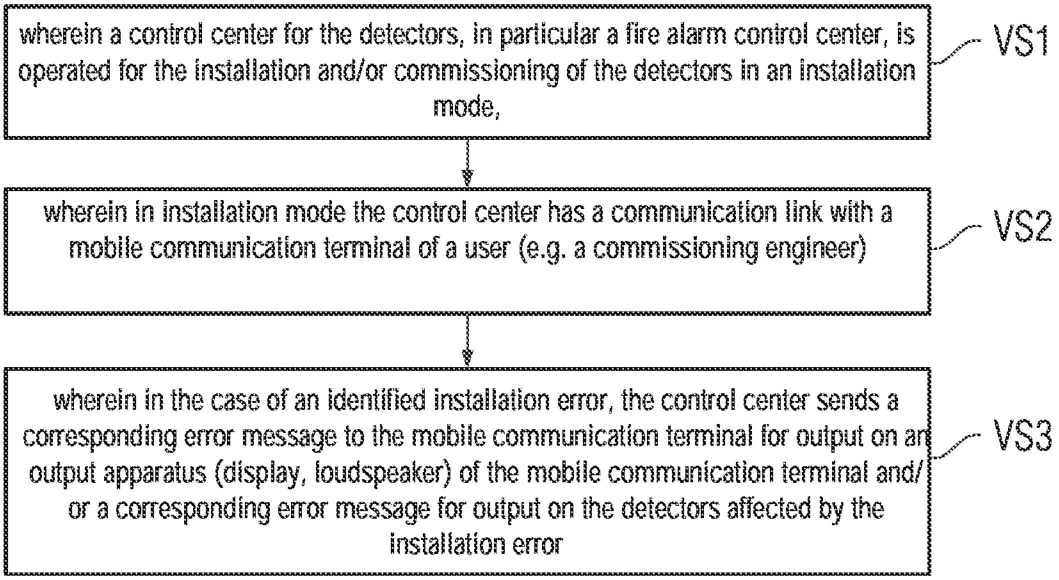
FIG. 2 shows an exemplary flow chart for a method for commissioning hazard detectors in a detector line incorporating teachings of the present disclosure.

FIG. 2 shows an exemplary flow chart for a method for commissioning hazard detectors (e.g. fire alarm boxes) in a detector line incorporating teachings of the present disclosure.

In some embodiments, there is a method for commissioning hazard detectors in a detector line, in particular fire alarm boxes, (VS1) wherein a control center for the detectors, in particular a fire alarm control center, is operated for the installation and/or commissioning of the detectors in an installation mode, (VS2) wherein in installation mode the control center has a communication link with a mobile communication terminal (e.g. smartphone, tablet computer) of a user (e.g. a commissioning engineer), (VS3) wherein in the case of an identified installation error, the control center sends a corresponding error message to the mobile communication terminal for output on an output apparatus (e.g. display, loudspeaker) of the mobile communication terminal and/or a corresponding error message for output on the detectors affected by the installation error. The detectors M1-M3 each comprise output elements AE1-AE3 for outputting the error message via text and/or visually and/or graphically and/or acoustically. The method can be realized using commercial components.

In some embodiments, the mobile communication terminal can be connected via data link directly with the fire alarm control center by way of a suitable communication link, e.g. via WLAN, radio. The mobile communication terminal MG can however also be connected via datalink indirectly with the fire alarm control center by way of suitable communication links, e.g. via a Cloud service CS, e.g. via Internet, WLAN, radio links.

With an identified installation error, the fire alarm control center can send a corresponding error message via a suitable communication link directly to the mobile communication terminal of a user. The corresponding error message can be output on the mobile communication terminal MG via text and/or graphically and/or acoustically on suitable output means (e.g. display D, loudspeaker, LED).

With an identified installation error, the fire alarm control center can however also send a corresponding error message indirectly via a corresponding Cloud service CS to the mobile communication terminal MG of the user, e.g. by way of corresponding communication links (Internet, radio).

With an identified installation error, the fire alarm control center Z can also send a corresponding error message via the detector line to the detector or detectors affected by the installation error. Here the detector line advantageously comprises an electrical supply line, which can also be used to transmit information. The detectors advantageously comprise in each case output elements for outputting the error message via text and/or visually and/or graphically and/or acoustically.

With an identified installation error, the fire alarm control center can however also send a corresponding error message indirectly via the corresponding Cloud service CS to the detector affected by the installation error, e.g. via corresponding communication links KV2, KV4 (Internet, radio).

In some embodiments, the line voltage for the detector line is essentially applied with no more than 30 volts. The installation mode is operated in a work step mode, in which, after each work step of the installation and/or the commissioning on the mobile communication terminal, the status of the respective work step for a respective detector is output.

An installation error can be e.g. a short-circuit on the detector line and/or an interruption in the detector line and/or an earth fault in the detector line and/or a reverse polarity of a respectively connected detector. Installation errors can be identified e.g. by one or more monitoring unit(s) for checking the electrical properties of the detector line ML, e.g. by one or more short-circuit identification units and/or by one or more overcurrent identification units and/or by one or more voltage detectors. The one or more monitoring unit(s) can be attached in the fire alarm control center and/or in the respective detectors, for instance.

The teachings of the present disclosure permits in particular the installation and commissioning process of a fire alarm system to be shortened significantly, since errors in the installation are noticed and corrected immediately, while the installer has access to the faulty place of installation. Moreover, no time is required for localizing the error, particularly when the installation of the cabling and its checking are carried out with a larger time offset and possibly by different employees. Moreover, the probability of errors is massively reduced (quality improvement).

The described method additionally enables the progress and quality in the installation process to be monitored and tracked; this may be of significant economic interest as a function of the order constellation (requirement for punctual completion). For such a monitoring, it is nowadays necessary to drive to site (time required). The method described below is very flexible with respect to the technical requirements in the respective individual case (e.g. existence of building plans in the Cloud, indoor position etc.). Available information is used as best as possible, but there is no requirement for the main applicability of the method.

The present disclosure relates to a fire alarm control center for connecting a detector line to a plurality of detectors connected thereto, wherein the fire alarm control center can be operated for the installation and/or commissioning of the detectors in an installation mode, wherein in installation mode the fire alarm control center has a communication link with a mobile communication terminal of a user (e.g. commissioning engineer), wherein in the case of an identified installation error, the fire alarm control center sends a corresponding error message to the mobile communication terminal for output on an output apparatus (e.g. display, audio) of the mobile communication terminal and/or wherein in the case of an identified installation error, the fire alarm control center sends a corresponding error message to the corresponding detector (e.g. the detector which is affected by the installation error) for output on an output apparatus (e.g. display, audio, LED).

REFERENCE CHARACTERS

M1-M3 Detectors
AE1-AE3 Output element
Z Central fire alarm system
ML Detector line
MG Mobile communication terminal
D Display
LS Line voltage
KV1-KV4 Communication link
FM1-FM3 Error message
S Server
CS Cloud service
DB Database
BIM Building information model
C Cloud
B Users
IPS Positioning system
VS1-VS3 Method step

What is claimed is:

1. A fire alarm control center for connecting a detector line to a plurality of detectors connected thereto, the control center comprising:
- a processor with an installation mode for installation and/or commissioning of the detectors the fire alarm control center;
- a communication link with a mobile communication terminal of a user;
- wherein in the case of an identified installation error the fire alarm control center sends a corresponding error message to the mobile communication terminal for output on an output apparatus of the mobile communication terminal and/or a corresponding error message for display on an output unit of the detector affected by the installation error;
- wherein checking the electrical properties of the detector line the monitoring unit is/are attached in the fire alarm control center.

2. The fire alarm control center as claimed in claim 1, wherein:
- the fire alarm control center is programmed to apply a suitable line voltage to the detector line in installation mode; and
- the applied line voltage lies in a region so that it is possible to carry out cabling work on the detector line safely and amounts in particular to 5 V±1 V and a direct voltage.

3. The fire alarm control center as claimed in claim 1, wherein the installation mode is configured to operate in a work step mode, in which, after each work step of the installation and/or the commissioning on the mobile communication terminal, the status of the respective work step can be output.

4. The fire alarm control center as claimed in claim 1, wherein an installation error is a short-circuit on the detector line and/or an interruption in the detector line and/or an earth fault of the detector line and/or a reverse polarity of a respectively connected detector.

5. The fire alarm control center as claimed in claim 1, wherein the fire alarm control center is connected to a Cloud service for communication with the mobile communication terminal.

6. The fire alarm control center as claimed in claim 5, wherein the Cloud service is part of an Internet-based ecosystem for a building automation system, in which the fire alarm control center and the mobile communication terminal are registered.

7. The fire alarm control center as claimed in claim 5, wherein, during installation, a detector is connected to the Cloud service and obtains its respective configuration data from the Cloud service through a communication link.

8. The fire alarm control center as claimed in claim 5, wherein the fire alarm control center is programmed to automatically synchronize information with the Cloud service via an installed detector.

9. An arrangement for a building automation for a building, the arrangement comprising:

a fire alarm control center;

a mobile communication terminal for communication with the fire alarm control center;

a Cloud server storing a building plan and/or a building information model for the building;

wherein the mobile communication terminal transmits position data for an installed detector to the Cloud server;

the respective position data of the installed detector is entered in the building plan and/or building information model stored on the Cloud server; and to check the electrical properties of the detector line a monitoring unit is attached in the fire alarm control center.

10. The arrangement as claimed in claim 9, further comprising a positioning system to determine the position of the mobile communication terminal and assign the position to the respectively installed detector.

11. The arrangement as claimed in claim 9, wherein a detector to be installed is connected to the Cloud server using a suitable communication link and via this communication link obtains its respective configuration data from the Cloud service by a download initiated by the mobile communication terminal.

12. A method for commissioning hazard detectors in a detector line, the method comprising:

operating a control center for the detectors for the installation and/or commissioning of the detectors in an installation mode;

wherein, in installation mode, the control center has a communication link with a mobile communication terminal of a user; and in the case of an identified installation error, the control center sends a corresponding error message to the mobile communication terminal for display on an output apparatus of the mobile communication terminal and/or a corresponding error message for display on an output unit of the detector affected by the installation error; and checking the electrical properties of the detector line in the fire alarm control center.

13. The method as claimed in claim 12, further comprising applying a line voltage to the detector line safe for a commissioning engineer;

wherein the line voltage comprises a direct voltage.

14. The method as claimed in claim 12, wherein the installation mode is operated in a work step mode, in which, after each work step of the installation and/or the commissioning on the mobile communication terminal, the status of the respective work step is generated for a respective detector.

15. The method as claimed in claim 12, wherein an installation error is a short-circuit on the detector line and/or an interruption in the detector line and/or an earth fault of the detector line and/or a reverse polarity of a respectively connected detector.

* * * * *